US012782213B2

(12) United States Patent
Macchi et al.

(10) Patent No.: US 12,782,213 B2
(45) **Date of Patent: *Nov. 3, 2026**

(54) METHOD AND A DEVICE FOR ESTIMATING RESIDUAL TORQUE BETWEEN THE BRAKED AND BRAKING ELEMENTS OF A VEHICLE

(71) Applicant: ITT ITALIA S.R.L., Lainate (IT)

(72) Inventors: Pietro Roberto Macchi, Turin (IT); Umberto Vignolo, Porte (IT); Marco Terranova, Turin (IT); Stefano Serra, Saluzzo (IT)

(73) Assignee: ITT Italia S.r.l, Lainate (IT)

( * ) Notice: Subject to any disclaimer, the term of this patent is extended or adjusted under 35 U.S.C. 154(b) by 387 days.

This patent is subject to a terminal disclaimer.

(21) Appl. No.: 18/563,172

(22) PCT Filed: Apr. 12, 2022

(86) PCT No.: PCT/EP2022/059702

§ 371 (c)(1),
(2) Date: Nov. 21, 2023

(87) PCT Pub. No.: WO2022/248114

PCT Pub. Date: Dec. 1, 2022

(65) Prior Publication Data

US 2024/0241003 A1 Jul. 18, 2024

(30) Foreign Application Priority Data

May 25, 2021 (IT) ........................ 102021000013529

(51) Int. Cl.
*G01L 5/28* (2006.01)
*B60T 17/22* (2006.01)
(Continued)

(52) U.S. Cl.
CPC ................ *G01L 3/16* (2013.01); *B60T 17/22* (2013.01); *F16D 66/00* (2013.01); *G01L 5/28* (2013.01);
(Continued)

(58) Field of Classification Search
CPC ... G01L 3/16; G01L 5/28; B60T 17/22; B60T 17/00; B60T 17/221; F16D 66/00;
(Continued)

(56) References Cited

U.S. PATENT DOCUMENTS 4,117,451 A 9/1978 Sato et al.
6,539,297 B2 * 3/2003 Weiberle ................ B60T 7/042
303/166
(Continued)

FOREIGN PATENT DOCUMENTS

EP 0173687 A1 3/1986
WO WO2018/019438 A1 2/2018

OTHER PUBLICATIONS

International Search Report for PCT Application No. PCT/EP2022/059702, dated Jul. 4, 2022, in 3 pages.

*Primary Examiner* — Freddie Kirkland, III
(74) *Attorney, Agent, or Firm* — VIA LLP

(57) ABSTRACT

A method for estimating the residual torque between the braked and braking elements of a vehicle that is characterized by the following phases: acquisition of the temperature value of said braking element; determination of whether said brake is activated when the temperature value is acquired; acceptance of the acquired temperature value if said brake is not activated at said acquisition time; if the acquired temperature value is accepted, automatically calculating a reference temperature using input from an N-dimensional calculation model with an N-dimensional vector of input variables; where said N-dimensional vector of variables
(Continued)

includes at least the acquired temperature of said braking element; where said N-dimensional calculation model is an analytical or experimental characterization of the thermal behavior of the brake; estimating residual torque by comparing the accepted acquired temperature to the calculated reference temperature.

13 Claims, 6 Drawing Sheets

(51) Int. Cl.
*F16D 66/00* (2006.01)
*G01L 3/16* (2006.01)

(52) U.S. Cl.
CPC .. *F16D 2066/001* (2013.01); *F16D 2066/005* (2013.01); *F16D 2066/006* (2013.01)

(58) Field of Classification Search
CPC ......... F16D 2066/001; F16D 2066/005; F16D 2066/006
See application file for complete search history.

(56) References Cited

U.S. PATENT DOCUMENTS

| | | | | |
|---|---|---|---|---|
| 8,066,339 | B2 | 11/2011 | Crombez et al. | |
| 8,151,944 | B2 | 4/2012 | Waltz | |
| 9,353,815 | B1 | 5/2016 | Eden | |
| 10,119,586 | B2 | 11/2018 | Merlo et al. | |
| 10,451,130 | B2 * | 10/2019 | Solari | F16D 66/021 |
| 11,441,629 | B2 * | 9/2022 | Solari | F16D 65/08 |
| 11,740,145 | B2 * | 8/2023 | Macchi | B60T 17/00 73/862.12 |
| 12,055,455 | B2 * | 8/2024 | Macchi | B60T 17/221 |
| 12,071,994 | B2 * | 8/2024 | Solari | F16D 66/021 |
| 2009/0296945 | A1 | 12/2009 | Attia et al. | |
| 2014/0311833 | A1 | 10/2014 | Martinotto et al. | |
| 2018/0106319 | A1 * | 4/2018 | Solari | B60T 17/221 |
| 2019/0351889 | A1 | 11/2019 | Serra et al. | |
| 2020/0088256 | A1 * | 3/2020 | Solari | B60T 17/22 |
| 2022/0176826 | A1 | 6/2022 | Cho | |
| 2022/0381631 | A1 | 12/2022 | Macchi et al. | |

* cited by examiner

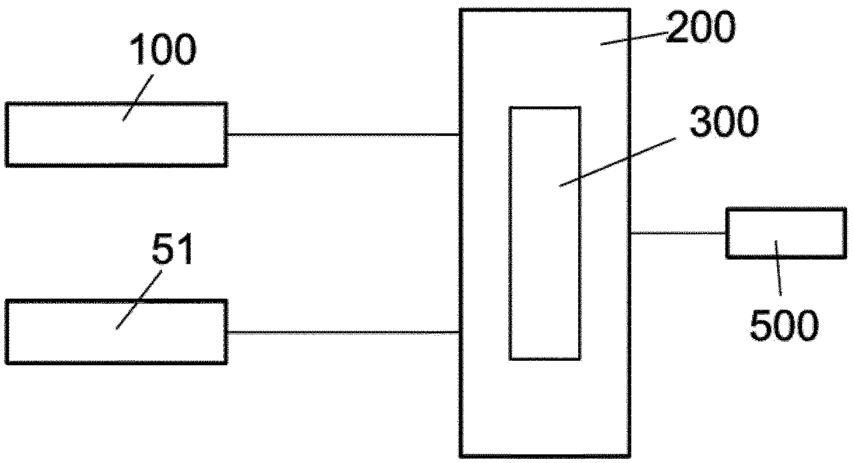
FIG. 6A
FIG. 6B
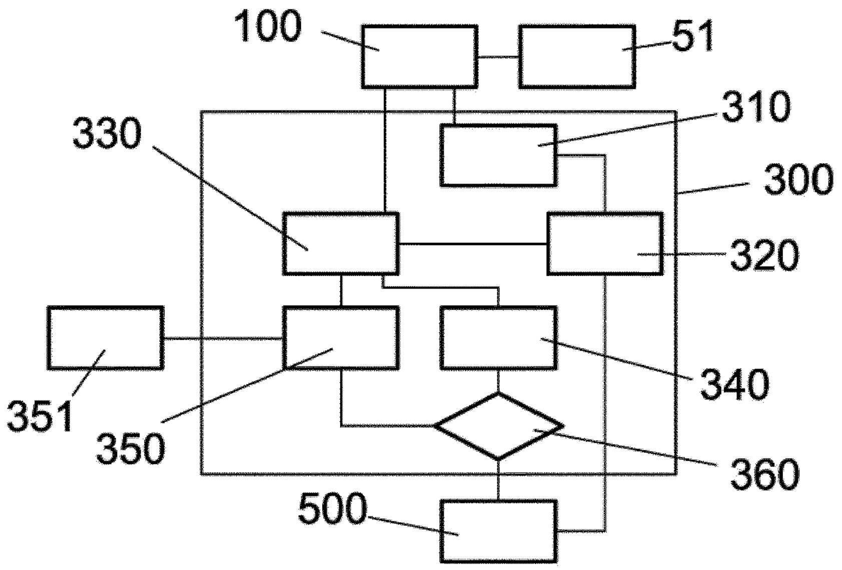
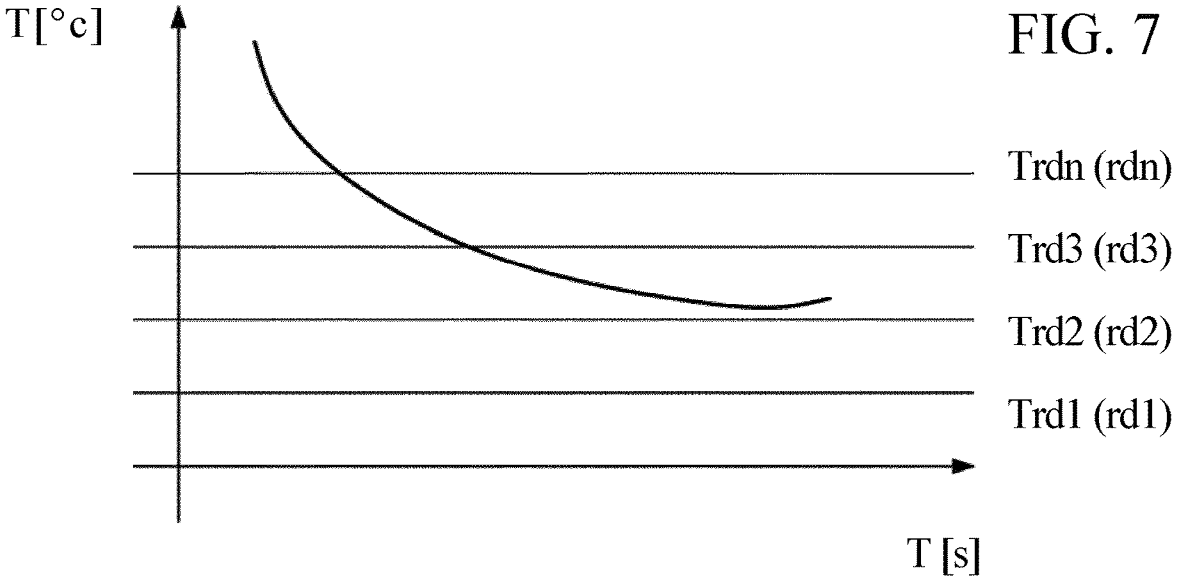
FIG. 7

METHOD AND A DEVICE FOR ESTIMATING RESIDUAL TORQUE BETWEEN THE BRAKED AND BRAKING ELEMENTS OF A VEHICLE

The following invention refers to a device and a method for detecting residual braking torque in a vehicle.

SUMMARY

As we know, residual braking torque is the braking torque, with relatively small values, witnessed in a vehicle due to the unintended interaction between the brake pad and the disc while the vehicle is not actually braking.

This condition, which is very common, is caused by abnormal operation of the brake caliper, which maintains a residual contact between the disc and the pad after braking.

The persistence of this contact condition, although small, maintains a nearly constant residual braking torque that has a considerable effect on fuel consumption and brake pad wear over the long term.

The new EU6 715/2007/EC standards on $CO_2$ emissions establish significantly more stringent limits on emissions, forcing vehicle manufacturers to seek innovative solutions in order to reduce them.

In this scenario, it is increasingly important to check for any suboptimal performance of the braking system and to limit and prevent any increase in residual braking torque, so as to reduce fuel consumption, and thus, the resulting emissions of the vehicle.

To date, there are very few systems for measuring residual braking torque.

This type of measurement can usually be performed in the laboratory on a dynamometric test bench, which is what is normally used to test and evaluate braking torque during the development of braking systems.

Equivalent on-board systems for vehicles are shown in WO2018019438A1, owned by this applicant.

Sensors for measuring caliper clearance are commercially available for heavy vehicle applications.

These sensors, however, only measure the total clearance of the entire caliper, i.e., the sum of the clearance of the two brake pads and their distance from the disc.

These known sensors, which are only available for truck applications, are unable to distinguish between the two brake pads, only measure geometric distances, and do not perform an actual measurement of resistance to residual advancement.

The task proposed by this invention is to overcome the above-mentioned limits of known techniques.

Within this task in mind, the invention's objective is to devise a device and method that can estimate residual braking torque in a vehicle due to undesirable interactions between the brake pad and the disc, for each brake pad.

The objective of the invention is also to conceive a device and method that enable real-time estimates of residual braking torque.

The objective of the invention is also to conceive a device and method that enable estimates of residual braking torque that can detect the minimum clearance between the brake pads and the disc, so as to help reduce brake delays.

Another important objective of the invention is to devise a device and method that can estimate residual braking torque in a manner compatible with on-board installations and applications.

Another important objective of the invention is to devise a device and method that can estimate residual braking torque in a manner compatible with on-board installations and applications, [connecting a means of connection and a means of recording to a remotely controlled system].

This task, as well as these and other purposes, are achieved by using a method to estimate the residual torque between the braking and braked elements of a vehicle that is characterized by the following phases:

- acquiring the temperature value of said braking element;
- determining whether this brake is activated when the temperature value is acquired;
- accepting the acquired temperature value if said brake is not activated at said acquisition time;
- if the acquired temperature value is accepted, automatically calculating a reference temperature using input from an N-dimensional calculation model with an N-dimensional vector of input variables; where said N-dimensional vector of variables includes at least the acquired temperature of said braking element; where said N-dimensional calculation model is an analytical or experimental characterization of the thermal behavior of the brake;
- estimating residual torque by comparing the accepted acquired temperature to the calculated reference temperature.

This invention also reveals a device for estimating the residual braking torque of a vehicle including:

- a braking element that includes a braking disc;
- a braking element that includes a wearable block of friction material and a back support plate for said friction material block;
- at least one temperature sensor configured and positioned to detect the temperature of said back support plate;
- an electronic control unit connected to said temperature sensor, with said electronic control unit implementing an N-dimensional calculation model that represents an analytical or experimental characterization of the brake's thermal behavior, with said electronic control unit being programmed to:
- acquire the temperature value of said back support plate from said temperature sensor;
- determine whether this brake is activated when the temperature value is acquired;
- accept the temperature value if said brake is not activated at said acquisition time;
- if the temperature value is accepted, then automatically calculate a temperature reference value by providing an N-dimensional vector of variables, including at least the acquired temperature of said back support plate, as input to said N-dimensional calculation model;
- estimate residual torque by comparing the accepted acquired temperature to the calculated reference temperature.

BRIEF DESCRIPTION OF THE DRAWINGS

Various embodiments are represented in the drawings included in attachment hereto for illustrative purposes, and the scope of this illustration must not in any way be interpreted as limiting.

Various characteristics of the different embodiments being disclosed may be combined to create additional embodiments, all of which are considered part of this illustration.

FIGS. 6A and 6B illustrate a fourth configuration of a preferred embodiment of the residual torque estimation method;

FIG. 7 shows a comparative example for the estimation of residual torque.

DETAILED DESCRIPTION OF A SELECTION OF EMBODIMENTS

Figure 1:
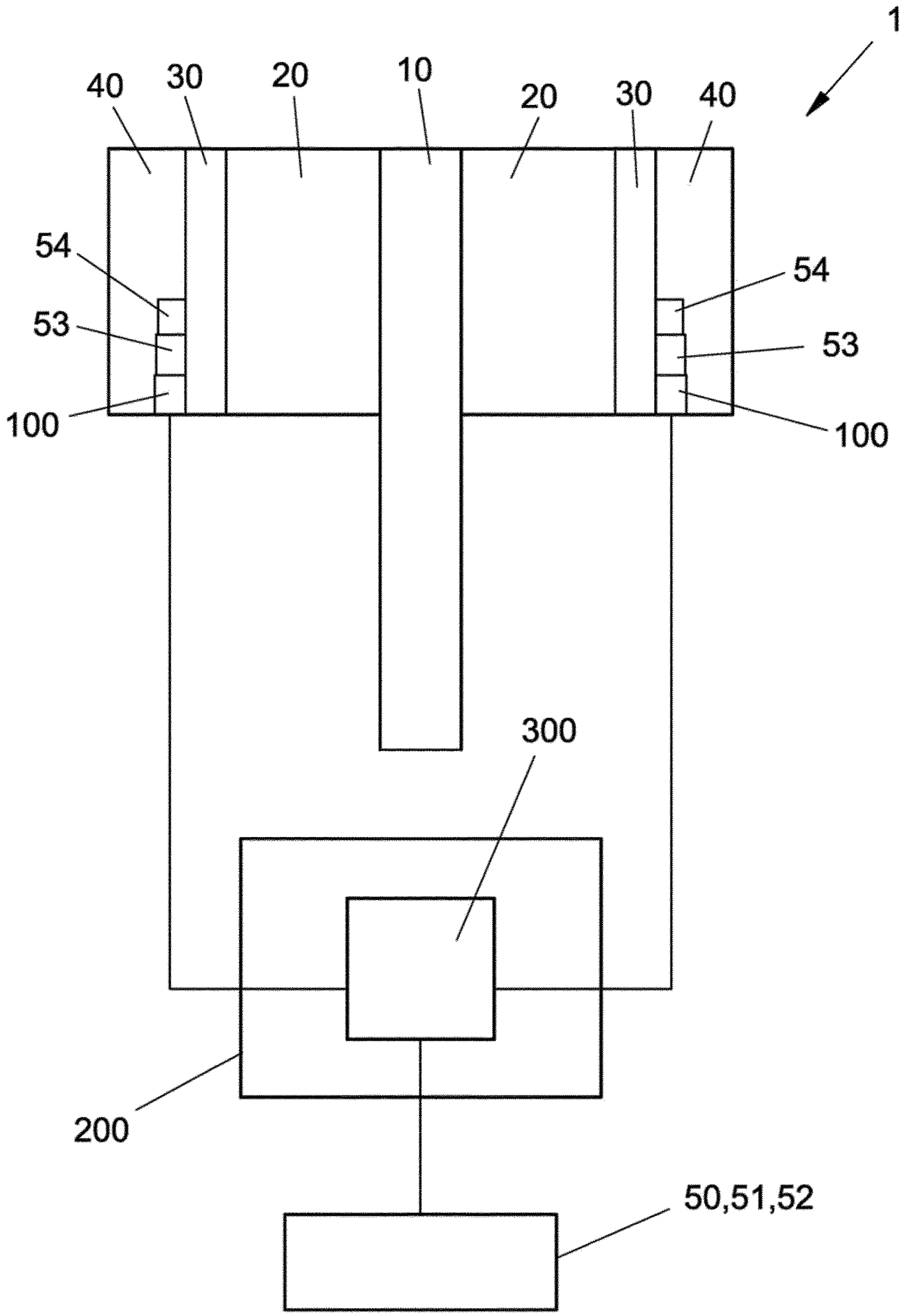
FIG. 1 shows a schematic diagram for a corner of the vehicle duly equipped with the components for estimating residual torque.

The following detailed description makes reference to the attached drawings, which form part of this description.

In the drawings, similar reference numbers typically identify similar components, unless otherwise dictated by the context.

The preferred forms of execution described in the detailed description and drawings are not intended to be limiting.

The components for only one corner of the vehicle are typically illustrated, the characteristics of which should be understood as being applicable to all corners.

Other embodiments may be used and other changes may be made without deviating from the spirit or scope of the subject-matter presented herein.

The aspects of this illustration, as described generally herein and illustrated in the figures, may be arranged, replaced, combined, separated and designed in a wide variety of different configurations, all of which are explicitly contemplated and presented in this illustration.

According to this invention, as schematically illustrated in FIG. 1, vehicle corner 1 is duly equipped with at least brake disc 10, wearable friction material block 20, back support plate 40, optional rear layer 30 between the wearable friction material block 20 and back support plate 40, and temperature sensor 100, configured and positioned to acquire the temperature of back support plate 40.

Temperature sensor 100 is a contact temperature sensor integrated into back support plate 40, or a non-contact temperature sensor.

Additionally, temperature sensor 100 may be configured and positioned to detect the surface temperature of back support plate 40 or the average temperature of back support plate 40.

For example, temperature sensor 100 may be positioned on the back support plate 40 surface facing wearable friction material block 20.

Temperature sensor 100 may be positioned on back support plate 40 and positioned flush with the back support plate 40 surface facing wearable friction material block 20.

If the surface temperature of back support plate 40 is to be detected, however, then this surface may be a back support plate 40 surface facing towards or away from wearable friction material block 20.

Temperature sensor 100 may be a separate component or may be silk-screened, printed directly onto the metal back support plate; different arrangements can be made by combining different types of sensors; multiple temperature sensors may be used for distributed temperature monitoring.

The braking element may be a brake pad that coordinates with a braking element represented by disc 10, as illustrated by way of example in FIG. 1, or a clamping jaw that coordinates with a drum.

The device for estimating residual torque includes electronic control unit (ECU) 200, which is connected to temperature sensor 100.

The method for estimating the residual torque of a vehicle braking element according to this invention provides for temperature sensors 100 to acquire the temperature detected on back support plate 40, the generation of temperature signals and the transmission of temperature signals to electronic control unit (ECU) 200.

Advantageously, electronic control unit (ECU) 200 is also connected to and receives input signals from a number of auxiliary sensors on board the vehicle.

The auxiliary sensors include one or more sensors chosen from vehicle speed sensor 50, ambient temperature sensor 51, and brake pedal activation sensor 52.

Vehicle speed detection and the recording of ambient temperature, i.e., the temperature for the corner of the vehicle where the braking device is operating, serve to refine the algorithm's performance and resolutions.

In addition, other sensors may be incorporated into the brake pad and connected to electronic control unit (ECU) 200.

The sensors embedded in the brake pad may include one or more sensors chosen between shear strain sensor 53 and pressure force sensor 54.

Innovatively and advantageously, according to this invention, calculation algorithm 300 oversees the data collection, control and output of electronic control unit (ECU) 200.

Advantageously, the signals for the variables detected by the auxiliary sensors are used to accept the temperature value acquired by temperature sensor 100 and are also configured, together with the acquired and accepted temperature value, into an N-dimensional array input to an N-dimensional model of calculation algorithm 300.

The N-dimensional model generates a reference temperature.

The residual torque is estimated by comparing the acquired and accepted temperature to the calculated reference temperature.

The N-dimensional calculation model is an analytical or experimental characterization of the thermal behavior of the brake.

For example, the N-dimensional calculation model is represented by the brake's thermal energy storage equation, where the thermal output energy, which equals the thermal energy lost by radiation, conduction, and convection, is equal to the incoming thermal energy generated by the friction of contact between the braking and braked elements of the brake.

The reference temperature, therefore, is calculated by feeding the equation with the N-dimensional input array, which also includes a residual pressure or residual brake-through-torque value between the braking and braked elements, which are assumed to have generated the reference temperature.

To estimate the residual torque with multiple identification levels, the calculation may be repeated with different residual pressure values or residual brake-through-torque values, which will correspond to different reference temperature values.

FIG. 7, for example, shows the trend over time for the acquired temperature T, and various values calculated for reference temperature $T_{rd1}$, $T_{rd2}$, $T_{rd3}$, and $T_{rdn}$.

Through a calibration curve, for example, each $T_{rd1}$, $T_{rd2}$, $T_{rd3}$, and $T_{rdn}$ is associated with a corresponding residual torque value rd1, rd2, rd3, and rdn.

In the case being illustrated, therefore, the comparison between the acquired temperature T and the calculated reference temperature values $T_{rd1}$, $T_{rd2}$, $T_{rd3}$, and $T_{rdn}$ is used to estimate the residual torque value between rd2 and rd3.

Advantageously, according to this invention, each corner of the vehicle may be equipped with one or two brake pads, with or without the sensors described above.

Advantageously, according to this invention, the residual torque calculation may be estimated by a single electronic control unit (ECU) for supervision and control, or by individual electronic control units (ECU) dedicated to each corner of the vehicle.

Advantageously, according to this invention, the residual torque calculation may be estimated in real time.

All acquisition and control algorithms are independent of vehicle type and/or braking pad and/or driving style, thanks to a self-assessment of the calibration of the signal threshold: advantageously, therefore, no tuning operations are necessary for the different applications.

The data capture may be based on two different strategies: a time-based strategy, or an event-based strategy.

Advantageously, according to this invention, the residual torque estimate is independent of the data acquisition strategy.

Figure 2A:
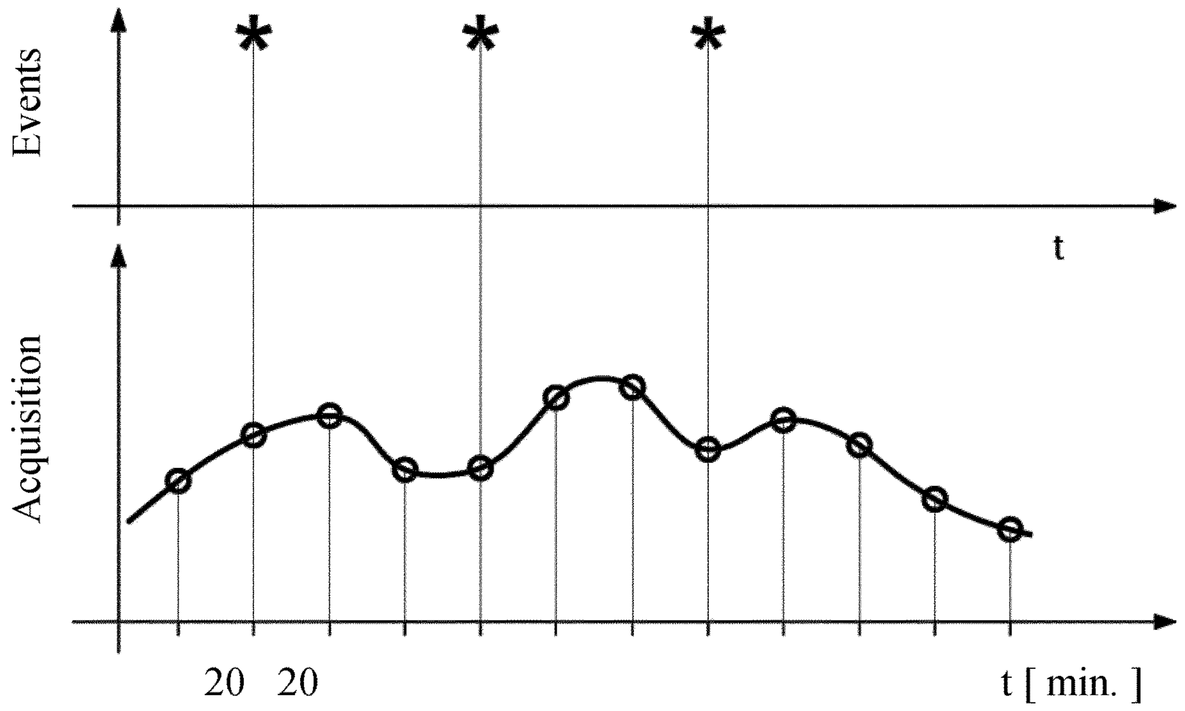
FIG. 2A shows two time-based data acquisition strategies.

FIG. 2A shows a time-based data acquisition strategy: time-based acquisition of the braking element temperature is based on a sampling frequency established over at least one time interval.

The data acquisition is synchronous with preset and constant acquisition periods, typically from 20 to 60 seconds, preferably 30 seconds, during the entire operation of the vehicle.

The acquisition takes place independently of brake pedal activation; activation of the pedal is recorded.

Figure 2B:
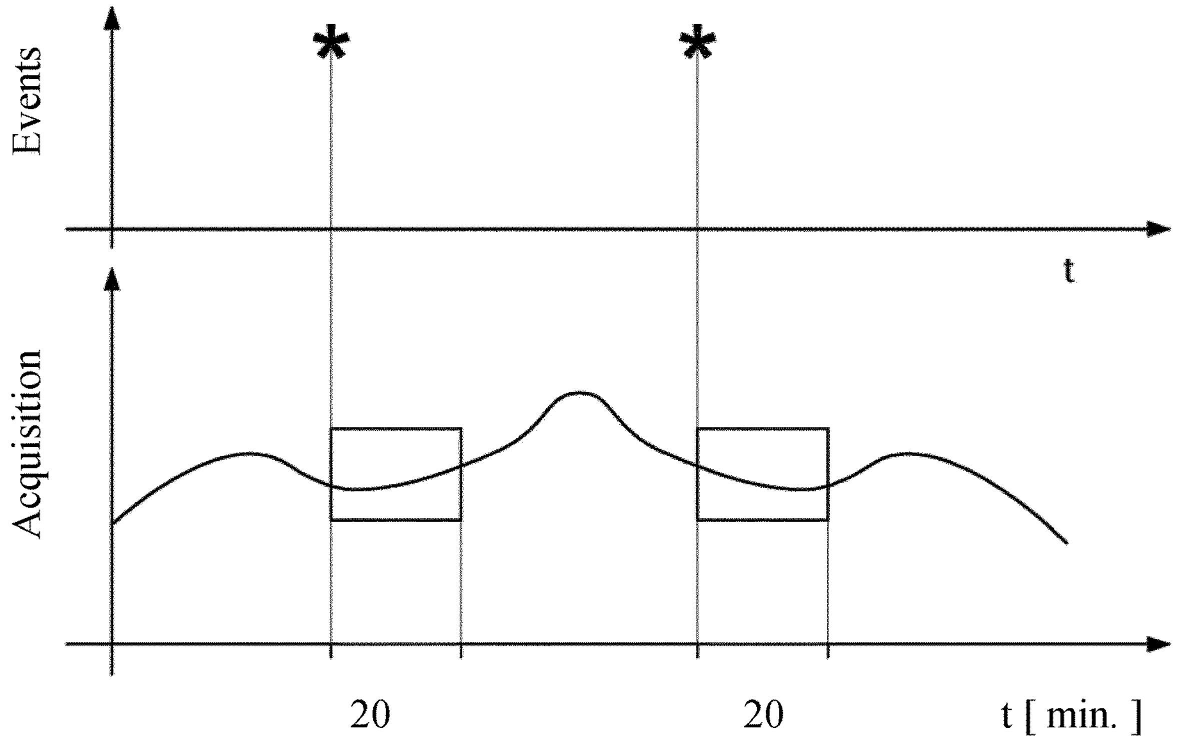
FIG. 2B shows a data acquisition strategy based on an activation event.

FIG. 2B illustrates a data capture strategy based on a trigger event: temporal acquisition of brake element temperature is based on continuous sampling capture logic over at least one fixed time interval from the instant of acquisition determined by the triggering of a braking event.

Activating the brake pedal will trigger the acquisition of data within a subsequent time window, typically from 10 to 60 minutes, preferably 30 minutes.

The data capture within the time window happens with preset and constant acquisition periods, typically from 20 to 60 seconds, preferably 30 seconds.

Any activation of the brake pedal within an already open time window triggers a subsequent time window starting from the brake pedal activation event.

Figure 3A:
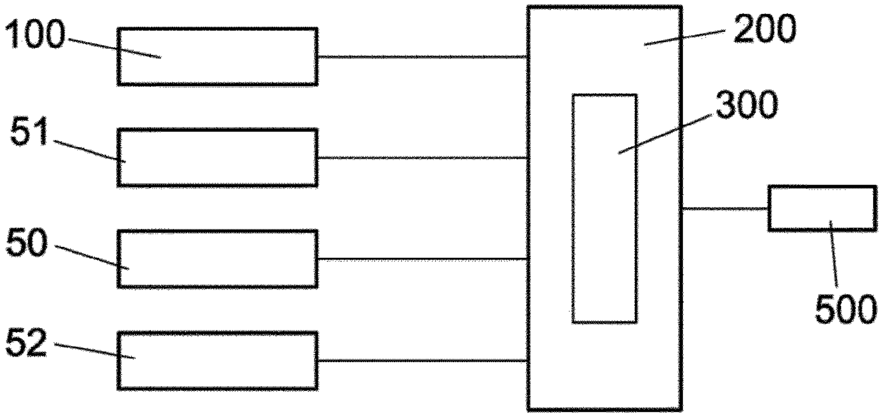
FIGS. 3A, 3B, and 3C illustrate the first configuration of a preferred embodiment of the residual torque estimation method.
Figure 3B:
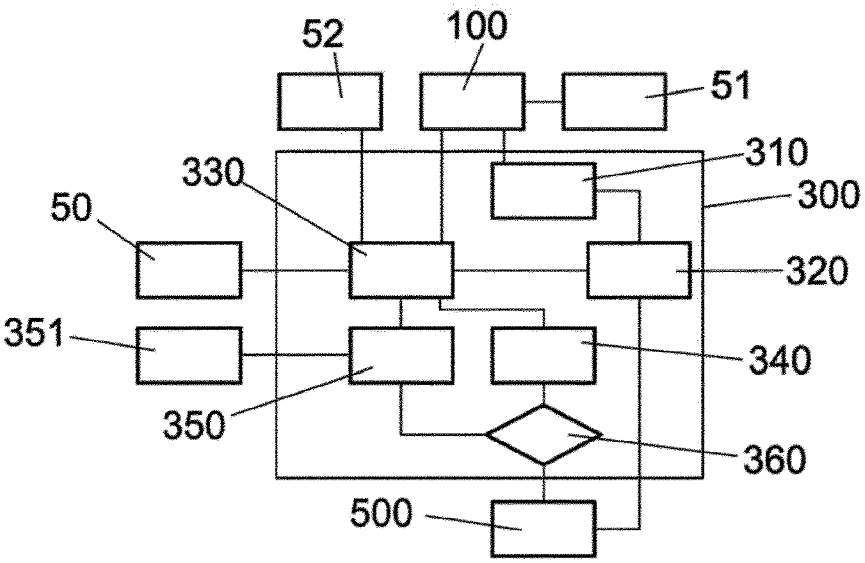
Figure 3C:
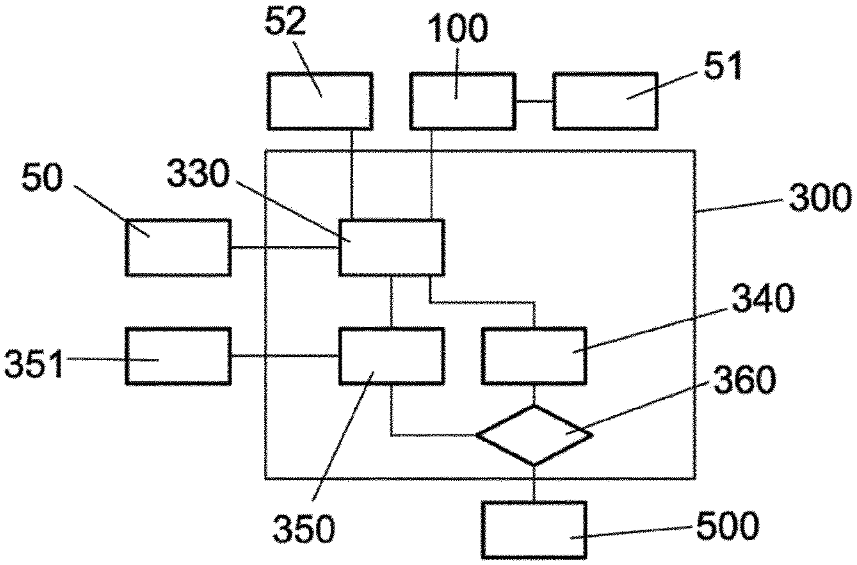

A first preferred configuration of an embodiment of the residual torque estimation method according to the present invention is illustrated in FIGS. 3A, 3B and 3C.

FIG. 3A schematically illustrates the system's architectural configuration.

The architecture includes at least one temperature sensor 100, one ambient temperature sensor 51, one speed sensor 50, one brake pedal activation sensor 52, and one electronic control unit (ECU) 200, which provides an estimate of residual torque 500 by processing the signals with algorithm 300.

FIG. 3B shows the first logical flow of the residual torque estimation method.

The ambient temperature detection in the corner of the vehicle detected by ambient temperature sensor 51 is used for seasonal calibration of the temperature detected by temperature sensor 100 of back support plate 40 of the brake pad.

An initial estimate of residual torque 500 is obtained through calculation section 310, which evaluates the first derivative for the time of the detected temperature, and section 320, which processes it based on the braking status: this obtains immediate information, especially for high levels of residual torque.

Calculation section 330 performs temperature selection under non-braking conditions based on the data received from temperature sensor 100, as corrected by ambient temperature sensor 51, from the data processed by calculation section 320, as shown above, from brake pedal activation sensor signal 52, and from the speed detected by vehicle speed sensor 50.

Calculation section 330 filters the temperature that is acquired and accepted in calculation section 340 by using low-pass filters to eliminate high-frequency peaks and components.

Calculation section 330 also generates a variable flag that enables reference temperature evaluation through calculation section 350, using N-dimensional model 351 powered by an N-dimensional vector of organized brake pad temperature data detected by sensor 100, ambient temperature detected by sensor 51, vehicle speed detected by sensor 50 and the time detected relative to the braking event detected by sensor 52.

N-dimensional model 351 may alternatively be: an analytical model derived from an analytical description of the energy exchanged between the disc and the pad during braking, or an experimental model derived from a set of experimental data collected during a series of dynamic energy exchanges between disc and pad.

Calculation section 350, therefore, calculates the reference temperature by feeding, for example, the equation representing the thermal equilibrium of the brake with the N-dimensional input array, which also includes a residual pressure or residual brake-through-torque value between the braking and braked elements, which are assumed to have generated the reference temperature.

Calculation section 360 receives and compares the selected temperature evaluation signals filtered by calculation section 340 and the reference temperature signal from calculation section 350 and produces and processes a signal for residual torque estimate 500.

This signal is then compared with the signal obtained from calculation section 320.

FIG. 3C shows the second logical flow of the residual torque estimation method.

This second logical flow differs from the first, as described above and illustrated in FIG. 3B, due to the lack of activation of calculation sections 310 and 320: the signal for residual torque estimate 500 is simply the signal obtained from calculation section 360.

Figure 4A:
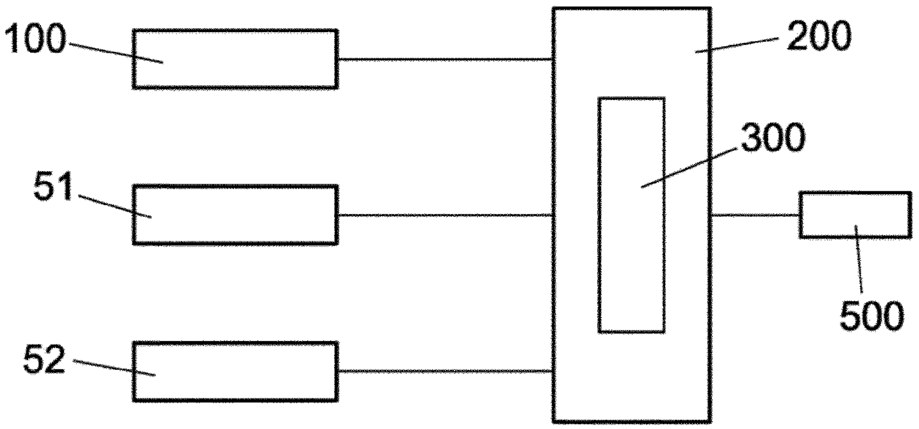
FIGS. 4A, 4B, and 4C illustrate a second configuration of a preferred embodiment of the residual torque estimation method.
Figure 4B:
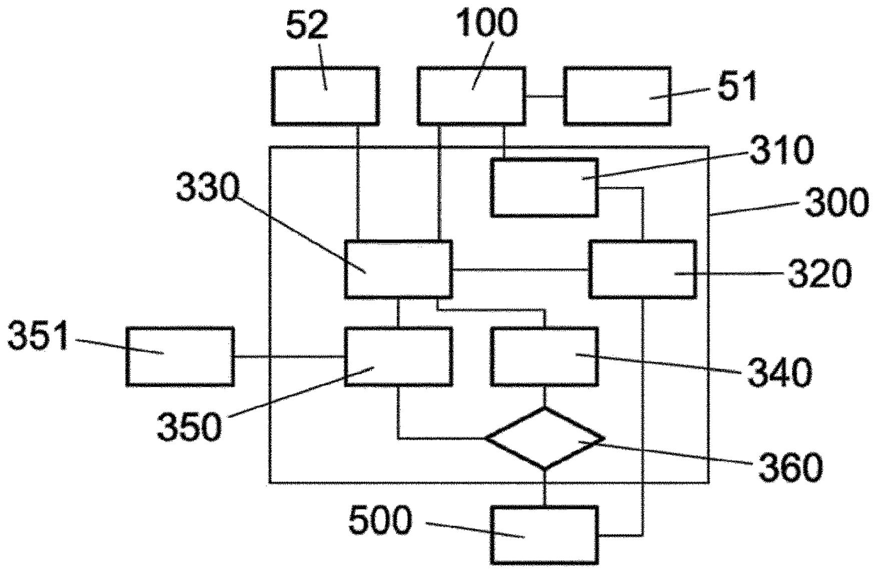
Figure 4C:
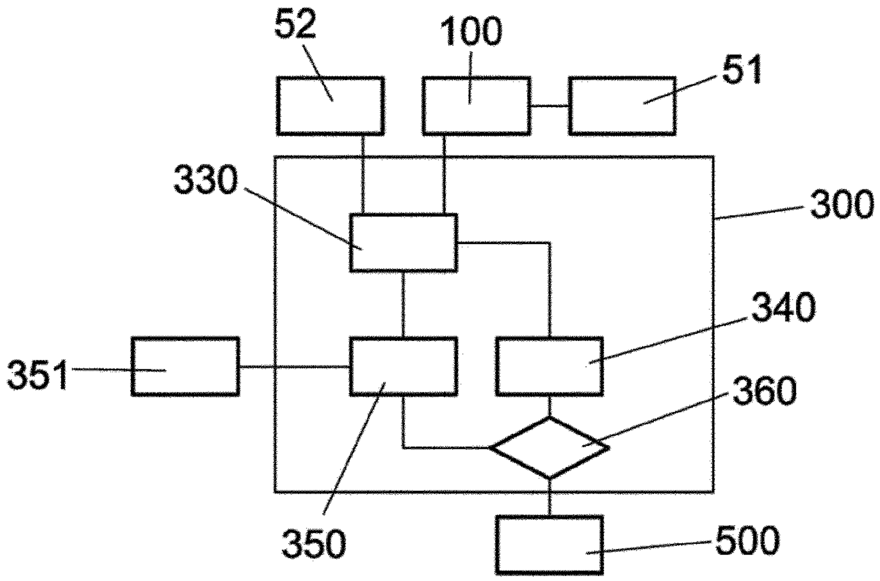

FIGS. 4A, 4B, and 4C show a second configuration of a preferred embodiment of the residual torque estimation method.

FIG. 4A schematically illustrates the system's architectural configuration.

The architecture includes at least one temperature sensor 100, one ambient temperature sensor 51, one brake pedal activation sensor 52, and one electronic control unit (ECU)

200, which provides an estimate of residual torque 500 by processing signals through algorithm 300.

The architecture of the second configuration differs from the first configuration shown in FIG. 3A due to the lack of speed data acquisition from vehicle speed sensor 50.

FIG. 4B shows the first logical flow of the residual torque estimation method based on a second configuration of the preferred embodiment.

The ambient temperature detection in the corner of the vehicle detected by ambient temperature sensor 51 is used for seasonal calibration of the temperature detected by temperature sensor 100 of back support plate 40 of the brake pad.

An initial estimate of residual torque 500 is obtained through calculation section 310, which evaluates the first derivative for the time of the detected temperature, and section 320, which processes it based on the braking status: this obtains immediate information, especially for high levels of residual torque.

Calculation section 330 performs temperature selection under non-braking conditions based on the data received from temperature sensor 100, as corrected by ambient temperature sensor 51, from the data processed by calculation section 320, as shown above, from brake pedal activation sensor signal 52.

Calculation section 330 filters the temperature that is acquired and accepted in calculation section 340 by using low-pass filters to eliminate high-frequency peaks and components.

Calculation section 330 also generates a variable flag that enables reference temperature evaluation through calculation section 350, using N-dimensional model 351 powered by an N-dimensional vector of organized brake pad temperature data detected by sensor 100, ambient temperature detected by sensor 51, and the time detected relative to the braking event detected by sensor 52.

Calculation section 360 receives and compares the selected temperature evaluation signals filtered by calculation section 340 and the reference temperature signal from calculation section 350 and produces and processes a signal for residual torque estimate 500.

This signal is then compared with the signal obtained from calculation section 320.

FIG. 4C shows a second logical flow of the residual torque estimation method based on a second configuration of the preferred embodiment.

This second logical flow differs from the first, as described above and illustrated in FIG. 4B, due to the lack of activation of calculation sections 310 and 320: the signal for residual torque estimate 500 is simply the signal obtained from calculation section 360.

Figure 5A:
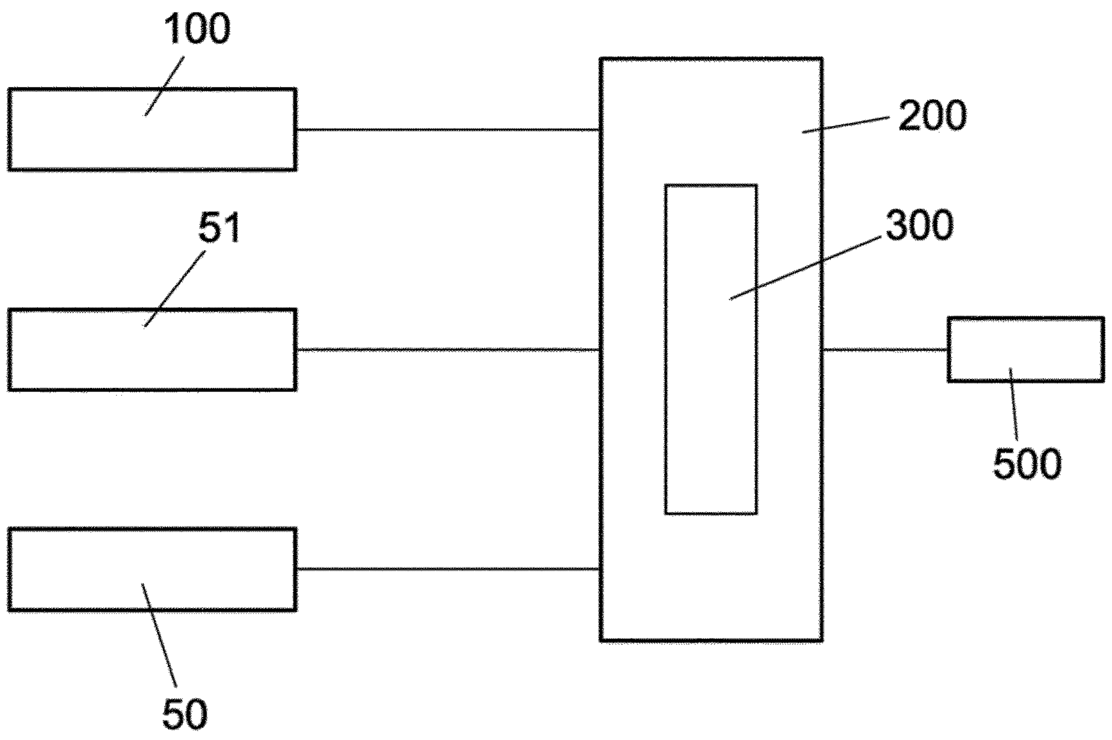
FIGS. 5A and 5B illustrate a third configuration of a preferred embodiment of the residual torque estimation method.
Figure 5B:
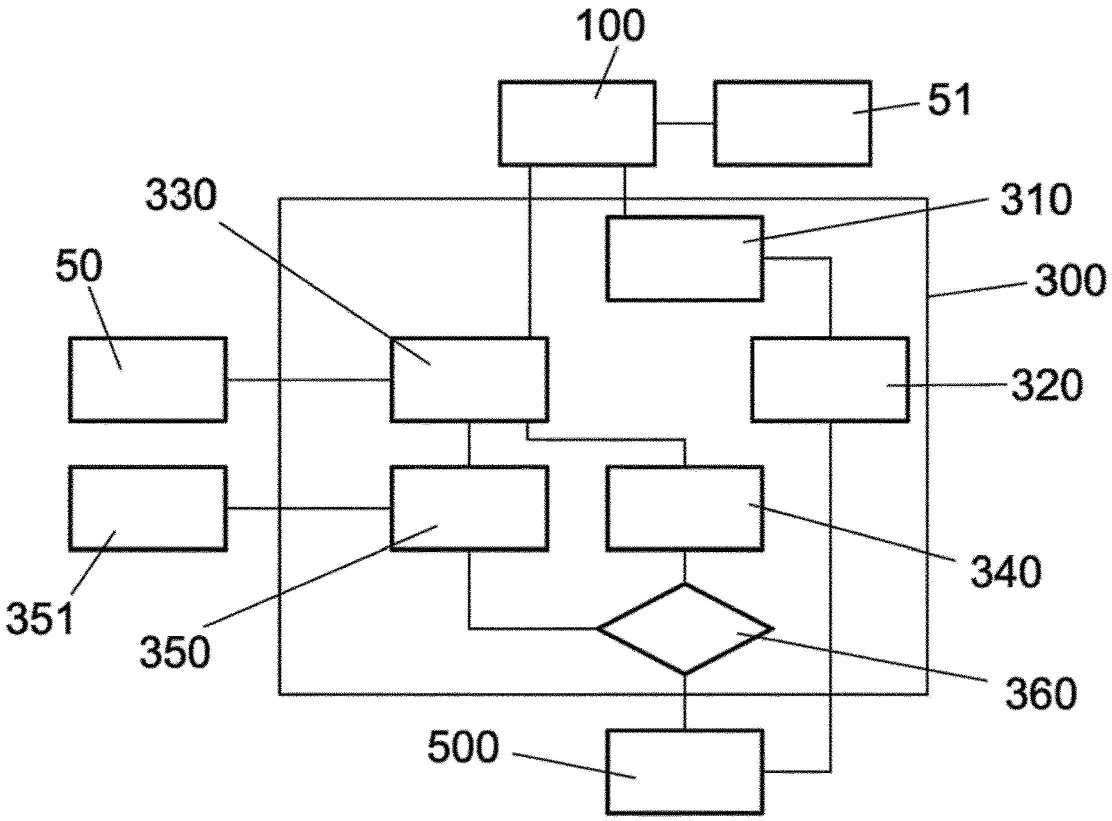

FIGS. 5A and 5B illustrate a third configuration of a preferred embodiment of the residual torque estimation method.

The architecture of the third configuration differs from the first configuration shown in FIG. 3A due to the lack of brake pedal activation data acquisition from sensor 52.

FIG. 5B shows the first logical flow of the residual torque estimation method based on a third configuration of the preferred embodiment.

The ambient temperature detection in the corner of the vehicle detected by ambient temperature sensor 51 is used for seasonal calibration of the temperature detected by temperature sensor 100 of back support plate 40 of the brake pad.

An initial estimate of residual torque 500 is obtained through calculation section 310, which evaluates the first derivative for the time of the detected temperature, and section 320, which processes it based on the braking status: this obtains immediate information, especially for high levels of residual torque.

One variant of the embodiment does not include calculation section 310.

Calculation section 330 performs temperature selection under non-braking conditions based on the data received from temperature sensor 100, as corrected by ambient temperature sensor 51, from the data processed by calculation section 320, as shown above, from the signal from vehicle speed sensor 50.

Calculation section 330 filters the temperature that is acquired and accepted in calculation section 340 by using low-pass filters to eliminate high-frequency peaks and components.

Calculation section 330 also generates a variable flag that enables reference temperature evaluation through calculation section 350, using N-dimensional model 351 powered by an N-dimensional vector of organized brake pad temperature data detected by sensor 100, ambient temperature detected by sensor 51, and vehicle speed detected by sensor 50.

Calculation section 360 receives and compares the selected temperature evaluation signals filtered by calculation section 340 and the reference temperature signal from calculation section 350 and produces and processes a signal for residual torque estimate 500.

This signal is then compared with the signal obtained from calculation section 320.

FIGS. 6A and 6B illustrate a fourth configuration of a preferred embodiment of the residual torque estimation method.

FIG. 6A schematically illustrates the system's architectural configuration.

The architecture of the fourth configuration differs from the first configuration shown in FIG. 3A due to the lack of brake pedal activation data acquisition from sensor 52 and the speed data from vehicle speed sensor 51.

FIG. 6B shows the logical flow of the residual torque estimation method based on a fourth configuration of the preferred embodiment.

The ambient temperature detection in the corner of the vehicle detected by ambient temperature sensor 51 is used for seasonal calibration of the temperature detected by temperature sensor 100 of back support plate 40 of the brake pad.

An initial estimate of residual torque 500 is obtained through calculation section 310, which evaluates the first derivative for the time of the detected temperature, and section 320, which processes it based on the braking status: this obtains immediate information, especially for high levels of residual torque.

One variant of the embodiment does not include calculation section 310.

Calculation section 330 performs temperature selection under non-braking conditions based on the data received from temperature sensor 100, as corrected by ambient temperature sensor 51, from the data processed by calculation section 320, as shown above.

Calculation section 330 filters the temperature that is acquired and accepted in calculation section 340 by using low-pass filters to eliminate high-frequency peaks and components.

Calculation section 330 also generates a variable flag that enables reference temperature evaluation through calculation section 350, using N-dimensional model 351 powered by an N-dimensional vector of organized brake pad temperature data detected by sensor 100, and ambient temperature detected by sensor 51.

Calculation section 360 receives and compares the selected temperature evaluation signals filtered by calculation section 340 and the reference temperature signal from calculation section 350 and produces and processes a signal for residual torque estimate 500.

This signal is then compared with the signal obtained from calculation section 320.

Other changes and variations to the method and the device for estimating the residual torque of a vehicle brake element are possible, of course.

The method for estimating the residual torque of a vehicle brake element conceived in this way is subject to numerous changes and variants, all falling within the scope of the inventive concept, as specified in the claims.

In addition, every detail can be replaced with other technically equivalent elements.

In practice, any type of materials and systems may be used to suit the needs and state of the art.

The invention claimed is:

1. A method for estimating residual braking torque of a vehicle, the method comprising:

- acquiring a temperature value of a braking element of the vehicle;
- determining whether a brake of the vehicle is activated when the temperature value is acquired;
- accepting the acquired temperature value if said brake is not activated at a time of said acquiring;
- if the acquired temperature value is accepted, automatically calculating a temperature reference value by providing an N-dimensional vector of variables as input to an N-dimensional calculation model;
- where said N-dimensional vector of variables includes at least the acquired temperature value of said braking element;
- where said N-dimensional calculation model is an analytical or experimental characterization of thermal behavior of the brake; and
- estimating residual braking torque by comparing the accepted acquired temperature value to the calculated temperature reference value.

2. The method of claim 1, wherein said N-dimensional vector of variables includes at least a speed of the vehicle.

3. The method of claim 1, wherein said N-dimensional vector of variables also includes at least an ambient temperature.

4. The method of claim 1, wherein said N-dimensional vector of variables also includes at least a time delay between an instant of temperature acquisition and a last instant in which the brake was activated.

5. The method of claim 1, wherein said braking element includes a braking disc, and said braking element includes a wearable block of friction material and a back support plate for said friction material block, and the temperature value of said braking element is acquired by at least one temperature sensor configured and positioned to detect a temperature of said back support plate.

6. The method of claim 1, wherein said acquiring the temperature value of said braking element is based on a sampling frequency for at least one preset time interval.

7. The method of claim 1, wherein said acquiring the temperature value of said braking element is based on continuous sampling for at least one preset time interval starting from an acquisition instant determined by an event.

8. The method of claim 1, further comprising using at least one of vehicle speed, temperature of the braking element, temporal variation of the temperature of the braking element, or brake pedal status to determine whether said brake is activated at an instant of temperature value acquisition.

9. The method of claim 1, wherein said estimating the residual braking torque comprises estimating the residual torque with said N-dimensional calculation model and, in addition, with an acquired time change in brake temperature.

10. A device for estimating residual braking torque of a vehicle, the device comprising:

- a brake comprising:
  - a braking disc, and
  - a braking element that includes a wearable block of friction material and a back support plate for said wearable block of friction material,
- at least one temperature sensor configured and positioned to detect a temperature of said back support plate, and
- an electronic control unit (ECU) connected to said temperature sensor, said electronic control unit (ECU) presenting an N-dimensional calculation model which represents an analytical or experimental characterization of thermal behavior of said brake, said electronic control unit (ECU) being programmed to:
  - acquire a temperature value of said back support plate from said temperature sensor;
  - determine whether said brake is activated when the temperature value is acquired;
  - accept the temperature value if said brake is not activated at a time of the acquisition;
  - if the temperature value is accepted, then automatically calculate a temperature reference value by providing an N-dimensional vector of variables, which includes at least the acquired temperature value of said back support plate as input to said N-dimensional calculation model; and
  - estimate residual braking torque by comparing the accepted acquired temperature value to the calculated temperature reference value.

11. The device of claim 10, wherein said temperature sensor is a contact temperature sensor integrated into said back support plate.

12. The device of claim 11, wherein said temperature sensor is a non-contact temperature sensor.

13. The device for of claim 10, wherein said temperature sensor is configured and positioned to detect a surface or internal temperature of said back support plate.

* * * * *